US012722412B2

(12) United States Patent
Sasazawa et al.

(10) Patent No.: US 12,722,412 B2
(45) Date of Patent: Sep. 1, 2026

(54) INK COMPOSITION AND INKJET-RECORDING METHOD

(71) Applicant: Nippon Kayaku Kabushiki Kaisha, Tokyo (JP)

(72) Inventors: Yukio Sasazawa, Tokyo (JP); Ha Sai, Tokyo (JP); Shogo Toda, Tokyo (JP); Tetsuya Iwazaki, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/998,720

(22) PCT Filed: Jul. 12, 2023

(86) PCT No.: PCT/JP2023/025660
§ 371 (c)(1),
(2) Date: Jan. 27, 2025

(87) PCT Pub. No.: WO2024/034313
PCT Pub. Date: Feb. 15, 2024

(65) Prior Publication Data

US 2026/0021673 A1 Jan. 22, 2026

(30) Foreign Application Priority Data

Aug. 8, 2022 (JP) ................................ 2022-126652

(51) Int. Cl.

| | |
|---|---|
| ***B41M 5/50*** | (2006.01) |
| ***B41J 2/155*** | (2006.01) |
| ***B41J 2/175*** | (2006.01) |
| ***B41M 5/52*** | (2006.01) |
| ***C09D 11/30*** | (2014.01) |

(52) U.S. Cl.
CPC ................ *B41M 5/50* (2013.01); *B41J 2/155* (2013.01); *B41J 2/175* (2013.01); *B41M 5/5245* (2013.01); *B41M 5/5254* (2013.01); *C09D 11/30* (2013.01)

(58) Field of Classification Search
CPC .... B41M 5/50; B41M 5/5245; B41M 5/5254; B41J 2/155; B41J 2/175; C09D 11/30
USPC ...................................................... 428/195.1
See application file for complete search history.

(56) References Cited

U.S. PATENT DOCUMENTS

| | | | | |
|---|---|---|---|---|
| 2003/0027892 A1* | 2/2003 | Wang | .................. | C09D 11/322 523/160 |
| 2003/0059702 A1* | 3/2003 | Moffat | ................ | G03G 9/0825 430/110.2 |
| 2004/0075726 A1* | 4/2004 | Hirai | ...................... | B41M 7/009 347/102 |
| 2009/0203833 A1 | 8/2009 | Sasada et al. | | |
| 2009/0246479 A1 | 10/2009 | Mukai et al. | | |
| 2010/0080962 A1* | 4/2010 | Koganehira | ........... | C09D 11/40 524/588 |
| 2014/0363642 A1 | 12/2014 | Kawaguchi et al. | | |
| 2017/0137647 A1 | 5/2017 | Kawaguchi et al. | | |
| 2022/0315783 A1 | 10/2022 | Sai et al. | | |
| 2023/0265301 A1* | 8/2023 | Nakamoto | ........... | C09D 11/107 524/562 |
| 2026/0021673 A1* | 1/2026 | Sasazawa | ................ | B41M 5/50 |

FOREIGN PATENT DOCUMENTS

| | | |
|---|---|---|
| JP | 2000-034432 A | 2/2000 |
| JP | 2000-072991 A | 3/2000 |
| JP | 2000-336292 A | 12/2000 |
| JP | 2001-019889 A | 1/2001 |
| JP | 2009-191133 A | 8/2009 |
| JP | 2009-242441 A | 10/2009 |
| JP | 2012-046639 A | 3/2012 |
| JP | 2013-193252 A | 9/2013 |
| JP | 2013-213210 A | 10/2013 |
| JP | 2017-141388 A | 8/2017 |
| JP | 6833339 B | 2/2021 |
| WO | WO 2013/115071 A1 | 8/2013 |
| WO | WO 2015/147192 A1 | 10/2015 |
| WO | WO 2021/006211 A | 1/2021 |

OTHER PUBLICATIONS

Extended European Search Report issued Jun. 15, 2026 in European Patent Application No. 23852296.5.

* cited by examiner

*Primary Examiner* — Betelhem Shewareged
(74) *Attorney, Agent, or Firm* — Knobbe, Martens, Olson & Bear, LLP

(57) ABSTRACT

An ink composition including a water-insoluble coloring agent, a dispersing agent, a resin A, a resin B, and water, in which the resin A is obtained through polymerization of at least a C1-C4 alkyl methacrylate and a C2-C6 alkyl acrylate, and the resin B is obtained through polymerization of at least a styrene-based monomer and divinyl benzene. An inkjet-recording method in which the ink composition is used; a recording medium to which the ink composition is attached; and an inkjet printer including a container filled with the ink composition.

13 Claims, No Drawings

INK COMPOSITION AND INKJET-RECORDING METHOD

This application is the U.S. National Phase under 35 U.S.C. § 371 of International Application PCT/JP2023/025660, filed Jul. 12, 2023, designating the U.S., and published in Japanese as WO 2024/034313 on Feb. 15, 2024, which claims priority to Japanese Patent Application No. 2022-126652, filed Aug. 8, 2022, the entire content of which is incorporated herein by reference.

TECHNICAL FIELD

The present invention relates to an ink composition, an inkjet recording method using the ink composition, a recorded medium with the ink composition deposited thereon, and an inkjet printer having a container containing the ink composition.

BACKGROUND ART

The inkjet printing method using an inkjet printer is known as one of the typical color printing methods. The inkjet method includes generating ink droplets; and depositing them onto a recording medium, such as paper, to form a print.

In recent years, the inkjet printing method has been increasingly used in industrial applications. Inkjet inks contain colorants, which are broadly classified into water-soluble colorants and water-insoluble colorants. In general, water-insoluble colorants, such as pigments, have higher fastness properties than water-soluble colorants. Thus, many types of industrial inkjet inks contain water-insoluble colorants. On the other hand, water-insoluble colorants generally have lower color vibrancy than water-soluble colorants. Under these circumstances, there is a strong demand for industrial inks that contain water-insoluble colorants and has high color vibrancy and high glossiness.

Substrates for use in industrial printing applications, such as various types of paper, fibers, and films, have tended to be diversified. Such substrates also include many non-ink-absorbent substrates or less-ink-absorbent substrates (hereinafter also collectively referred to as "non- or less-ink-absorbent substrates"). Known examples of inks for printing on such non- or less-ink-absorbent substrates include non-aqueous solvent inks and curable inks.

However, such non-aqueous solvent inks and curable inks contain a large amount of volatile organic compounds (VOCs), which can pose safety issues concerning the natural environment, living organisms, and so on. Thus, there is a strong demand for aqueous inks that are also printable on non- or less-ink-absorbent substrates. Aqueous inks have a composition with a minimized VOC content and contain a water-insoluble colorant and a dispersing agent. In general, aqueous inks also contain resin, wax, or other materials for improving rubfastness, solvent resistance, or the like. Such aqueous inks are very easy to dry due to their high solid component content and can easily dry into a solid. When printed on non- or less-ink-absorbent substrates, such aqueous inks will form a coating of the solid component, which provides improved fixation on the substrates and improved rubfastness. The stronger the coating of the solid component, the better the resulting print.

Prints on non- or less-ink-absorbent substrates are also required to have scratch resistance in addition to the ability to fix on the substrates and rubfastness. By nature, non- or less-ink-absorbent substrates, which have a poor ability to absorb ink, are generally disadvantageous for fixation and rubfastness. Thus, the coating of the solid component is demanded to be stronger so that it can have higher scratch resistance.

Meanwhile, inks will dry during long-term storage or storage in high-temperature or low-humidity environments. Inks stored in an inkjet printer can dry to form a solid in nozzles or ink flow channels of the inkjet head, which may cause clogging. Such clogging in the inkjet head may cause problems including hinderance of stable ink ejection and degradation of recorded image quality. Such clogging may also increase the frequency of the inkjet head itself becoming inoperable, which will raise a serious problem. Thus, such a solid is strongly required to have the ability to be easily washed away even if formed in the inkjet head or other parts. Unfortunately, there is some trade-off between the ability to be easily washed away and the improvement of fixation, rubfastness, and scratch resistance by the coating formation, and no proposal has been made for aqueous inks capable of serving both functions. For these reasons, methods have been proposed for preventing ink from drying using cap members provided on nozzle parts of industrial inkjet heads. Unfortunately, it is still very difficult to prevent ink drying completely.

Patent Documents 1 to 8 disclose resin emulsions or resin particle dispersions, and ink compositions containing the emulsions or dispersions.

CITATION LIST

Patent Document

Patent Document 1: PCT International Publication No. WO2015/147192
Patent Document 2: Japanese Unexamined Patent Application, Publication No. 2000-34432
Patent Document 3: Japanese Unexamined Patent Application, Publication No. 2000-336292
Patent Document 4: Japanese Unexamined Patent Application, Publication No. 2009-191133
Patent Document 5: Japanese Unexamined Patent Application, Publication No. 2013-213210
Patent Document 6: Japanese Unexamined Patent Application, Publication No. 2017-141388
Patent Document 7: PCT International Publication No. WO2021/006211
Patent Document 8: Japanese Patent No. 6833339
Patent Document 9: PCT International Publication No. WO2013/115071

DISCLOSURE OF THE INVENTION

Problems to be Solved by the Invention

It is an object of the present invention to provide an ink composition having high color vibrancy and high glossiness and also having high scratch resistance and high ability to be washed away and to provide an inkjet recording method using such an ink composition; a recorded medium with such an ink composition deposited thereon; and an inkjet printer having a container containing such an ink composition.

Means for Solving the Problems

Specific solutions to the problems described above include the following aspects.

<1> An ink composition including: a water-insoluble colorant; a dispersing agent; a resin A; a resin B; and water, the resin A being a resin including a product of polymerization of at least C1-C4 alkyl methacrylate and C2-C6 alkyl acrylate, the resin B being a resin including a product of polymerization of at least a styrenic monomer and divinylbenzene.

<2> The ink composition according to aspect <1>, wherein the resins A and B are each a resin including a product of polymerization of a reactive emulsifier having a radically polymerizable double bond in its molecule.

<3> The ink composition according to aspect <2>, wherein the reactive emulsifier has an anionic group in its molecule.

<4> The ink composition according to aspect <3>, wherein the anionic group is a salt of a sulfate ester group.

<5> The ink composition according to any one of aspects <1> to <4>, further including a water-soluble organic solvent.

<6> An inkjet recording method including: ejecting droplets of the ink composition according to any one of aspects <1> to <4> onto a recording medium from an inkjet printer in response to a recording signal to perform recording.

<7> The inkjet recording method according to aspect <6>, wherein the recording medium is a recording medium having an ink-receiving layer.

<8> The inkjet recording method according to aspect <6>, wherein the recording medium is a recording medium having no ink-receiving layer.

<9> The inkjet recording method according to any one of aspects <6> to <8>, wherein the inkjet printer is a line head type inkjet printer.

<10> A recorded medium including: a recording medium; and the ink composition according to any one of aspects <1> to <4> deposited on the recording medium.

<11> The recorded medium according to aspect <10>, wherein the recording medium is one selected from the group consisting of a recording medium having an ink-receiving layer and a recording medium having no ink-receiving layer. <12> An inkjet printer comprising a container containing the ink composition according to any one of aspects <1> to <4>.

<13> The inkjet printer according to aspect <12>, wherein the inkjet printer is a line head type inkjet printer.

Effects of the Invention

The present invention provides an ink composition having high color vibrancy and high glossiness and also having high scratch resistance and high ability to be washed away; an inkjet recording method using such an ink composition; a recorded medium with such an ink composition deposited thereon; and an inkjet printer having a container containing such an ink composition.

PREFERRED MODE FOR CARRYING OUT THE INVENTION

<Ink Composition>

An ink composition according to the present embodiment includes a water-insoluble colorant, a dispersing agent, a resin A, a resin B, and water, in which the resin A is a resin including a product of polymerization of at least C1-C4 alkyl methacrylate and C2-C6 alkyl acrylate, and the resin B is a resin including a product of polymerization of at least a styrenic monomer and divinylbenzene. Hereinafter, the components of the ink composition according to the present embodiment will be described in detail. It will be understood that a single material or a combination of two or more materials may be used as each of the components described below.

[Water-Insoluble Colorant]

The term "water-insoluble colorant" means a colorant having a solubility in water at 25° C. of typically 3 g/L or less, preferably 2 g/L or less, more preferably 1 g/L or less.

Examples of the water-insoluble colorant include pigments, disperse dyes, and solvent dyes. The water-insoluble colorant is typically a colorant selected from the group consisting of C.I. Pigment, C.I. Disperse, and C.I. Solvent.

Examples of pigments include inorganic pigments, organic pigments, and extender pigments.

Examples of inorganic pigments include carbon black, metal oxides, metal hydroxides, metal sulfides, metal ferrocyanides, and metal chlorides.

Examples of carbon black include thermal black, acetylene black, oil furnace black, gas furnace black, lamp black, gas black, and channel black. Preferred examples include furnace black, lamp black, acetylene black, and channel black. Various types of carbon black are easily available from companies such as Columbia Carbon, Cabot, Degussa, and Mitsubishi Chemical Corporation.

Examples of organic pigments include soluble azo pigments, insoluble azo pigments, insoluble diazo pigments, condensed azo pigments, phthalocyanine pigments, quinacridone pigments, isoindolinone pigments, dioxazine pigments, perylene pigments, perinone pigments, thioindigo pigments, anthraquinone pigments, and quinophthalone pigments.

Specific examples of organic pigments include C.I. Pigment Yellow 1, 2, 3, 12, 13, 14, 16, 17, 24, 55, 73, 74, 75, 83, 93, 94, 95, 97, 98, 108, 114, 128, 129, 138, 139, 150, 151, 154, 180, 185, 193, 199, and 202; C.I. Pigment Red 5, 7, 12, 48, 48:1, 57, 88, 112, 122, 123, 146, 149, 150, 166, 168, 177, 178, 179, 184, 185, 202, 206, 207, 254, 255, 257, 260, 264, 269, and 272; C.I. Pigment Blue 1, 2, 3, 15, 15:1, 15:2, 15:3, 15:4, 15:6, 16, 22, 25, 60, 66, and 80; C.I. Pigment Violet 19, 23, 29, 37, 38, and 50; C.I. Pigment Orange 13, 16, 68, 69, 71, and 73; C.I. Pigment Green 7, 36, and 54; and C.I. Pigment Black 1.

Examples of extender pigments include silica, calcium carbonate, talc, clay, barium sulfate, and white carbon. To improve powder flowability, these extender pigments are often used in combination with inorganic or organic pigments.

The water-insoluble colorant may also be a self-dispersing pigment including pigment particles having undergone chemical surface treatment for imparting self-dispersibility.

Examples of disperse dyes include C.I. Disperse Yellow 9, 23, 33, 42, 49, 54, 58, 60, 64, 66, 71, 76, 79, 83, 86, 90, 93, 99, 114, 116, 119, 122, 126, 149, 160, 163, 165, 180, 183, 186, 198, 200, 211, 224, 226, 227, 231, and 237; C.I. Disperse Red 60, 73, 88, 91, 92, 111, 127, 131, 143, 145, 146, 152, 153, 154, 167, 179, 191, 192, 206, 221, 258, and 283; C.I. Disperse Orange 9, 25, 29, 30, 31, 32, 37, 38, 42, 44, 45, 53, 54, 55, 56, 61, 71, 73, 76, 80, 96, and 97; C.I. Disperse Violet 25, 27, 28, 54, 57, 60, 73, 77, 79, and 79:1; and C.I. Disperse Blue 27, 56, 60, 79:1, 87, 143, 165, 165:1, 165:2, 181, 185, 197, 202, 225, 257, 266, 267, 281, 341, 353, 354, 358, 364, 365, and 368.

The water-insoluble colorant may also be a water-insoluble copolymer colored with a water-soluble colorant. Examples of the water-insoluble copolymer include polyesters, and dispersing agents and resins described later.

Examples of the water-soluble colorant include direct dyes, acid dyes, food dyes, basic dyes, reactive dyes, vat dyes, and soluble vat dyes. Typical examples of such colorants include dyes selected from the group consisting of C.I. Direct dyes, C.I. Acid dyes, C.I. Food dyes, C.I. Basic dyes, C.I. Reactive dyes, C.I. Vat dyes, and C.I. Solubilized Vat dyes.

The water-insoluble copolymer colored with the water-soluble colorant may include a copolymer the same as or different from, for example, the copolymer for use as the dispersing agent. In a case where the same copolymer is used, the copolymer colored by the water-soluble colorant and the copolymer not colored by any water-soluble colorant respectively correspond to the water-insoluble colorant and the dispersant.

In particular, the water-insoluble colorant is preferably a pigment, more preferably a pigment selected from C.I. Pigments.

The ink composition according to the present embodiment generally has a water-insoluble colorant content of 1 to 30% by mass, preferably 1 to 15% by mass, more preferably 2 to 10% by mass, based on the total mass of the ink composition.

[Dispersing Agent]

The dispersing agent may be, for example, a copolymer of at least two monomers selected from the group consisting of: styrene and a derivative thereof; vinylnaphthalene and a derivative thereof; an aliphatic alcohol ester of an $\alpha,\beta$-ethylenically unsaturated carboxylic acid; (meth)acrylic acid and a derivative thereof; maleic acid and a derivative thereof; itaconic acid and a derivative thereof; fumaric acid and a derivative thereof; and vinyl acetate, vinyl alcohol, vinyl pyrrolidone, acrylamide, and derivatives thereof (preferably, at least one of the selected two or more monomers is a hydrophilic monomer). The hydrophilic monomer may be acrylic acid, methacrylic acid, or any other monomer having a carboxy group that can remain after polymerization.

Examples of such a copolymer include styrene-(meth)acrylic acid copolymers, styrene-(meth)acrylic acid-(meth)acrylate copolymers, (meth)acrylate-(meth)acrylic acid copolymers, polyethylene glycol (meth)acrylate-(meth)acrylic acid copolymers, and styrene-maleic acid copolymers. Among them, styrene-(meth)acrylic acid copolymers, styrene-(meth)acrylic acid-(meth)acrylate copolymers, (meth)acrylate-(meth)acrylic acid copolymers, and polyethylene glycol (meth)acrylate-(meth)acrylic acid copolymers are preferred; styrene-(meth)acrylic acid copolymers, styrene-(meth)acrylic acid-(meth)acrylate copolymers, and (meth)acrylate-(meth)acrylic acid copolymers are more preferred; (meth)acrylate-(meth)acrylic acid copolymers are even more preferred; and methacrylate-methacrylic acid copolymers are furthermore preferred. The type of the copolymer may be, for example, a block copolymer, a random copolymer, or a graft copolymer. These copolymers may also be in the form of a salt.

As used herein, the term "(meth)acrylic" is intended to include both "acrylic" and "methacrylic". The same applies to the term "(meth)acrylate" and like terms.

The dispersing agent may be synthesized or obtained commercially.

For example, the copolymer is preferably synthesized as the A-B block copolymer disclosed in PCT International Publication No. WO2013/115071. The A block of the A-B block polymer disclosed in WO2013/115071 is derived from at least one monomer selected from the group consisting of (meth)acrylic acid and linear or branched C4 alkyl (meth)acrylate, preferably derived from at least one monomer selected from the group consisting of methacrylic acid and n-butyl methacrylate, more preferably derived from both methacrylic acid and n-butyl methacrylate. The B block of the A-B block polymer disclosed in WO2013/115071 is derived from at least one monomer selected from the group consisting of benzyl methacrylate and benzyl acrylate, preferably derived from benzyl methacrylate. Examples of the A-B block polymer include the block copolymers disclosed from the "Synthetic Example 3" section to the "Synthetic Example 8" section in WO2013/115071.

Examples of commercially available dispersing agents include Joncryl 62, 67, 68, 678, and 687 (styrene-acrylic copolymers manufactured by BASE); Mowinyl S-100A (a modified vinyl acetate copolymer manufactured by Japan Coating Resin Corporation); and JURYMER AT-210 (a polyacrylic ester copolymer manufactured by Toagosei Co., Ltd.).

The dispersing agent generally has a mass-average molecular weight (Mw) of 3000 to 50000, preferably 7000 to 25000. The mass-average molecular weight of the dispersing agent can be measured using gel permeation chromatography (GPC). Specifically, the measurement may be performed using a GPC system (HLC-8320GPC manufactured by Tosoh Corporation), two columns (TSKgel Super Multipore HZ-H manufactured by Tosch Corporation, 4.6 mm in inner diameter and 15 cm in length), an eluent (tetrahydrofuran), and a standard sample (TSK Standard manufactured by Tosch Corporation).

The dispersing agent generally has an acid value of 50 to 300 mgKOH/g, preferably 80 to 275 mgKOH/g, more preferably 80 to 250 mgKOH/g.

The dispersing agent may be used in the form of a mixture with the water-insoluble colorant. The surfaces of the water-insoluble colorant particles may be partially or entirely coated with the dispersing agent to be used. Both of these forms may also be used in combination.

The ink composition according to the present embodiment is preferably prepared by a process including; preparing a dispersion containing the water-insoluble colorant and the dispersing agent; and then mixing the dispersion with other components. The dispersion may be prepared using methods known in the art.

As an example, the dispersion may be prepared by phase inversion emulsification. In such a case, specifically, the dispersing agent is dissolved in an organic solvent, such as 2-butanone, and an aqueous solution of a neutralizing agent is added to the resulting solution to form an emulsion. The water-insoluble colorant is added to the resulting emulsion and subjected to dispersion treatment. The organic solvent and some of the water are removed from the resulting liquid by distillation under reduced pressure, so that the desired dispersion is obtained. The dispersion treatment may be performed using a sand mill (bead mill), a roll mill, a ball mill, a paint shaker, an ultrasonic disperser, a microfluidizer, or any other means. For example, the dispersion treatment may be performed using a sand mill filled at an appropriate ratio with beads having a size of approximately 0.01 to 1 mm. The resulting dispersion may be subjected to an operation such as filtration or centrifugation. Such an operation allows the resulting dispersion to contain uniform-size particles. If bubbles form during the preparation of the dispersion, a very small amount of a known defoaming agent, such as a silicone-based or acetylene glycol-based defoaming agent, may be added.

The dispersion may also be prepared by other methods, such as acidification, interfacial polymerization, in-situ polymerization, in-liquid curing method, coacervation (phase separation), in-liquid drying method, melt dispersion cooling method, air suspension coating method, and spray drying.

Preferred examples of the preparation method include phase inversion emulsification, acidification, and interfacial polymerization.

In the dispersion, the water-insoluble colorant generally has an average particle diameter (D50) of 300 nm or less, preferably 30 to 280 nm, more preferably 40 to 270 nm, even more preferably 50 to 250 nm. Moreover, the average particle diameter (D90) of the water-insoluble colorant is generally 400 nm or less, preferably 350 nm or less, more preferably 300 nm or less. The average particle diameter (D90) preferably has a lower limit of 100 nm or more. Furthermore, the average particle diameter (D10) of the water-insoluble colorant is generally 10 nm or more, preferably 20 nm or more, more preferably 30 nm or more. The average particle diameter (D10) preferably has an upper limit of 100 nm or less. The particle size of the water-insoluble colorant can be measured using laser light scattering.

The ink composition according to the present embodiment generally has a dispersing agent content of 0.5 to 6.0% by mass, preferably 0.5 to 4.0% by mass, more preferably 1.0 to 4.0% by mass, based on the total mass of the ink composition.

[Resin A]

The resin A is a resin (copolymer) including a product of polymerization of at least C1-C4 alkyl methacrylate and C2-C6 alkyl acrylate. In other words, the resin A includes at least a C1-C4 alkyl methacrylate monomer unit and a C2-C6 alkyl acrylate monomer unit as structural units. The ink composition including the resin A with such features can have a reduced VOC content and tends to have higher storage stability and higher re-dispersibility. The type of the resin A may be, for example, a block copolymer, a random copolymer, or a graft copolymer, and is preferably a random copolymer. The resin A may also be in the form of a salt. The resin A can be synthesized using known methods.

Examples of the C1-C4 alkyl methacrylate include linear alkyl methacrylates, such as methyl methacrylate, ethyl methacrylate, n-propyl methacrylate, and n-butyl methacrylate; branched alkyl methacrylates, such as isopropyl methacrylate, isobutyl methacrylate, and text-butyl methacrylate; and cyclic alkyl methacrylates, such as cyclopropyl methacrylate and cyclobutyl methacrylate. In particular, the C1-C4 alkyl methacrylate is preferably a linear alkyl methacrylate, more preferably a linear C1-C3 alkyl methacrylate, even more preferably methyl methacrylate.

Examples of the C2-C6 alkyl acrylate include linear alkyl acrylates, such as ethyl acrylate, n-propyl acrylate, n-butyl acrylate, n-pentyl acrylate, and n-hexyl acrylate; branched alkyl acrylates, such as isopropyl acrylate, isobutyl acrylate, isopentyl acrylate, and isohexyl acrylate; and cyclic alkyl acrylates, such as cyclobutyl acrylate, cyclopentyl acrylate, and cyclohexyl acrylate. In particular, the C2-C6 alkyl acrylate is preferably a linear alkyl acrylate, more preferably a linear C2-C6 alkyl acrylate, even more preferably butyl acrylate.

The resin A may also be a resin including a product of polymerization of the C1-C4 alkyl methacrylate, the C2-C6 alkyl acrylate, and an additional monomer (1), such as a C2-C4 unsaturated alkyl methacrylate, methacrylic acid, or sodium styrene sulfonate. A single additional monomer (1) may be used, or two or more additional monomers (1) may be used in combination.

Examples of the C2-C4 unsaturated alkyl methacrylate include vinyl methacrylate, allyl methacrylate, and 3-methyl-3-butynyl methacrylate. In particular, the C2-C4 unsaturated alkyl methacrylate is preferably a C3 unsaturated alkyl methacrylate, more preferably allyl methacrylate.

Table 1 below shows a guide for the ranges of the contents of the C1-C4 alkyl methacrylate (preferably, methyl methacrylate), the C2-C6 alkyl acrylate (preferably, butyl acrylate), and the additional monomer (1). The contents of the C1-C4 alkyl methacrylate, the C2-C6 alkyl acrylate, and the additional monomer (1) are preferably adjusted so as to fall within the ranges shown in Table 1 based on the total mass (100 parts by mass) of the resulting monomer mixture. In Table 1, the values are "parts by mass", and the abbreviations have the following meaning.

MC1-4: C1-C4 alkyl methacrylate

AC2-6: C2-C6 alkyl acrylate

TABLE 1

| Content range | General | Preferred | More preferred | Even more preferred |
|---|---|---|---|---|
| MC1-4 | 33.0~57.0 | 35.0~55.0 | 37.0~53.0 | 39.0~51.0 |
| AC2-6 | 27.0~62.0 | 30.0~59.4 | 32.0~56.0 | 35.4~54.0 |
| Additional monomer (1) | 0~15.0 | 5.6~15.0 | 7.0~15.0 | 7.0~13.6 |

The resin A is preferably a resin including a product of polymerization of the C1-C4 alkyl methacrylate, the C2-C6 alkyl acrylate, and all of the C2-C4 unsaturated alkyl methacrylate (preferably allyl methacrylate), methacrylic acid, and sodium styrene sulfonate, which are the additional monomers (1). In this case, the content of the C2-C4 unsaturated alkyl methacrylate is preferably 0.5 to 2.0 parts by mass, more preferably 0.7 to 2.0 parts by mass, even more preferably 0.7 to 1.8 parts by mass, based on the total mass (100 parts by mass) of the monomer mixture. Moreover, the content of methacrylic acid is preferably 5.0 to 12.0 parts by mass, more preferably 6.0 to 12.0 parts by mass, even more preferably 6.0 to 11.0 parts by mass, based on the total mass (100 parts by mass) of the monomer mixture. Furthermore, the content of sodium styrene sulfonate is preferably 0.1 to 1.0 parts by mass, more preferably 0.3 to 1.0 parts by mass, even more preferably 0.3 to 0.8 parts by mass, based on the total mass (100 parts by mass) of the monomer mixture.

The resin A may be synthesized or obtained commercially. The resin A is preferably synthesized using the monomer mixture and a reactive emulsifier. The use of the reactive emulsifier allows the production of a resin A emulsion. The ink composition according to the present embodiment is preferably prepared using such a resin A emulsion.

The reactive emulsifier is an emulsifier having a radically polymerizable double bond in the molecule. In general, the reactive emulsifier molecule has one radically polymerizable double bond. The reactive emulsifier is preferably an anionic, reactive emulsifier, which has an anionic group in its molecule. Such an anionic, reactive emulsifier is also referred to as, for example, a "reactive anionic surfactant". Examples of the anionic group include a sulfonic acid group, a sulfonate group, a sulfate ester group, a phosphoric acid groups, a phosphate ester group, a nitrate ester group, a carboxy group, and salts thereof. In particular, the anionic group is preferably a sulfonic acid group, a sulfonate group, a sulfate ester group, or a salt thereof, more preferably a salt of a sulfate ester group. Examples of the salt include ammonium salts and alkali metal salts (e.g., sodium salts, potassium salts).

In particular, the reactive emulsifier is preferably an ethylenically unsaturated monomer having a group selected from the group consisting of a sulfonic acid group, a sulfonate group, a sulfate ester group, a phosphoric acid group, a phosphoric acid ester group, and salts thereof.

Examples of the reactive emulsifier include ammonium polyoxyalkylene alkenyl ether sulfate, ammonium ether sulfate, phosphate esters, bis(polyoxyethylene polycyclic phenyl ether) methacrylate sulfate, sodium sulfoethyl methacrylate, alkoxypolyethylene glycol maleate, and salts thereof. Specific examples of the reactive emulsifier include sodium alkylallyl sulfosuccinate (ELEMINOL JS-20 manufactured by Sanyo Chemical Industries, Ltd.), dipotassium alkenyl succinate (LATEMUL ASK manufactured by Kao Corporation), polyoxyethylene alkylpropenylphenyl ether sulfate salt (AQUALON HS-10 manufactured by DKS Co., Ltd.), α-[1-{[(allyloxy}methyl]-2-(nonylphenoxy)ethyl]-ω-polyoxyethylene sulfate salt (ADEKA REASOAP SE series, such as ADEKA REASOAP SE-10N, manufactured by ADEKA Corporation), polyoxyethylene-1-(allyloxymethyl) alkyl ether sulfate ammonium salt (AQUALON KH series, such as AQUALON KH-1025, manufactured by DKS Co., Ltd.), styrenesulfonate salt (SPINOMER NaSS manufactured by Tosch Finechem Corporation), α-[2-[(allyloxy)-1-(alkyloxymethyl)ethyl]-ω-polyoxyethylene sulfate salt (ADEKA REASOAP SR series, such as ADEKA REASOAP SR-1025, manufactured by ADEKA Corporation), polyoxyethylene polyoxybutylene (3-methyl-3-butenyl) ether sulfate salt (LATEMUL PD-104 manufactured by Kao Corporation), and an ammonium salt of sulfuric acid ester of a product of polyaddition of oxirane with a product of reaction between C10-C14 branched alkanol and 1-(allyloxy)-2,3-epoxypropane, which is composed mainly of α-[2-(allyloxy)-1-({C10-C14 alkyloxy}methyl)ethyl]-ω-hydroxypoly(oxyethylene) (n=1 to 100). In particular, the reactive emulsifier is preferably an ammonium salt of sulfuric acid ester of a product of polyaddition of oxirane with a product of reaction between C10-C14 branched alkanol and 1-(allyloxy)-2,3-epoxypropane, which is composed mainly of α-[2-(allyloxy)-1-({C10-C14 alkyloxy}methyl) ethyl]-ω-hydroxypoly(oxyethylene) (n=1 to 100).

The resin A may be prepared using any amount of the reactive emulsifier. As a guide, the reactive emulsifier is generally used in an amount of 0.1 to 10% by mass, preferably 0.3 to 5% by mass, more preferably 0.5 to 3% by mass, even more preferably 1 to 3% by mass, based on the total mass of the monomer mixture. When the reactive emulsifier is used in an amount in such a range, the resin A will tend to be synthesized in a stable manner, to have an average particle diameter controlled in a desired range, and to form an emulsion having a viscosity that is adjustable within a desired range.

The resin A generally has an average particle diameter of 10 to 500 nm, preferably 20 to 200 nm, more preferably 25 to 150 nm, even more preferably 30 to 130 nm. The resin A with an average particle diameter in the range of 10 to 500 nm will tend to be less likely to cause clogging in inkjet heads and less likely to undergo re-aggregation.

The resin A generally has a glass transition temperature (Tg) of 10 to 65° C., preferably 20 to 60° C., more preferably 30 to 55° C., even more preferably 40 to 50° C. The resin A generally has an acid value of 20 to 85 mgKOH/g, preferably 30 to 80 mgKOH/g, more preferably 40 to 75 mgKOH/g, even more preferably 50 to 70 mgKOH/g.

The resin A generally has an insolubility in tetrahydrofuran of 60 to 100%, preferably 70 to 80%. The resin A with an insolubility in such a range will tend to have a controlled average molecular weight and to be free of impurities such as unreacted monomers.

The content (on a solid basis) of the resin A in the ink composition according to the present embodiment generally has a lower limit of 0.1% by mass, preferably 0.2% by mass, more preferably 0.3% by mass, and generally has an upper limit of 10% by mass, preferably 7% by mass, more preferably 6% by mass, even more preferably 5% by mass, based on the total mass of the ink composition.

[Resin B]

The resin B is a resin (copolymer) including a product of polymerization of at least a styrenic monomer and divinylbenzene. In other words, the resin B includes at least a styrenic monomer unit and a divinylbenzene monomer unit as structural units. The ink composition including the resin B with such features tends to have constant storage stability and higher rubfastness. The type of the resin B may be, for example, a block copolymer, a random copolymer, or a graft copolymer, and is preferably a random copolymer. The resin B may also be in the form of a salt. The resin B can be synthesized using known methods.

The styrenic monomer is a compound including a monocyclic aromatic ring and an ethylenically unsaturated bond-containing substituent bonded to the aromatic ring, which may further have an additional substituent, such as a halogen atom, such as fluorine, chlorine, or bromine; an alkyl group, such as methyl, ethyl, n-propyl, isopropyl, n-butyl, tert-butyl, or octyl; a nitro group; an amino group; a hydroxy group; a sulfo group; or a carboxy group. The alkyl substituent may be further substituted with a halogen atom or other substituents. Examples of the styrenic monomer include styrene, p-fluorostyrene, m-fluorostyrene, 2,3,4,5,6-pentafluorostyrene, p-chlorostyrene, o-chlorostyrene, m-chlorostyrene, p-bromostyrene, o-bromostyrene, m-bromostyrene, α-methylstyrene, o-methylstyrene, m-methylstyrene, p-methylstyrene, 1-ethyl-2-vinylbenzene, 3-(trifluoromethyl) styrene, 4-isopropenyltoluene, 4-tert-butylstyrene, 4-n-octylstyrene, 2,4,6-trimethylstyrene, 4-vinylbiphenyl, 4-vinylbenzoic acid, 4-vinylbenzoic acid amine, o-vinylbenzylcyanide, m-vinylbenzylcyanide, 4-methoxystyrene, 2-vinylphenylacetic acid, 1-(1-ethoxyethoxy)-4-vinylbenzene, 4-tert-butoxystyrene, methyl 4-vinylbenzoate, 4-vinylphenyl acetate, 4-(trifluoromethyl)styrene, 4-(chloromethyl)styrene, 4-fluoro-α-methylstyrene, p-nitrostyrene, p-aminostyrene, m-aminostyrene, trimethyl (4-vinylphenyl)silane, trimethoxy (4-vinylphenyl)silane, diphenyl(4-vinylphenyl)phosphine, 3-vinylphenylboric acid, 4-vinylphenylboric acid, and sodium styrene sulfonate. In particular, the styrenic monomer is preferably styrene, α-methylstyrene, or sodium styrene sulfonate, which is highly reactive during polymerization and can form highly stable resin particles, more preferably styrene or sodium styrene sulfonate.

Examples of divinylbenzene include 1,2-divinylbenzene, 1,3-divinylbenzene, and 1,4-divinylbenzene.

The resin B may also be a resin including a product of polymerization of the styrenic monomer, divinylbenzene, and an additional monomer (2), such as acrylic acid, methacrylic acid, or n-dodecyl mercaptan. A single additional monomer (2) may be used, or two or more additional monomers (2) may be used in combination.

Table 2 below shows a guide for the ranges of the contents of the styrenic monomer, divinylbenzene, and the additional monomer (2). The contents of the styrenic monomer, divinylbenzene, and the additional monomer (2) are preferably adjusted so as to fall within the ranges shown in Table 2 based on the total mass (100 parts by mass) of the resulting monomer mixture. In Table 2, the values are "parts by mass", and the abbreviations have the following meaning.

STM: Styrenic monomer

DVB: Divinylbenzene

TABLE 2

| Content range | General | Preferred | More preferred | Even more preferred |
|---|---|---|---|---|
| STM | 25.5~56.8 | 27.6~54.8 | 29.8~52.0 | 33.6~49.8 |
| DVB | 43.0~67.0 | 45.0~65.0 | 47.0~63.0 | 49.0~61.0 |
| Additional monomer (2) | 0~6.5 | 1.1~6.5 | 1.7~6.5 | 1.7~5.9 |

The resin B is preferably a resin including a product of polymerization using styrene and sodium styrene sulfonate as styrenic monomers. In this case, the content of styrene is preferably 27.5 to 53.8 parts by mass, more preferably 29.5 to 51.0 parts by mass, even more preferably 33.3 to 49.0 parts by mass, based on of the total mass (100 parts by mass) of the monomer mixture. Moreover, the content of sodium styrene sulfonate is preferably 0.1 to 1.0 part by mass, more preferably 0.3 to 1.0 part by mass, even more preferably 0.3 to 0.8 parts by mass, based on the total mass (100 parts by mass) of the monomer mixture.

The resin B is also preferably a resin including a product of polymerization of the styrenic monomer, divinylbenzene, and all of acrylic acid, methacrylic acid, and n-dodecyl mercaptan, which are the additional monomers (2). In this case, the content of acrylic acid is preferably 0.5 to 2.5 parts by mass, more preferably 0.7 to 2.5 parts by mass, even more preferably 0.7 to 2.3 parts by mass, based on of the total mass (100 parts by mass) of the monomer mixture. Moreover, the content of methacrylic acid is preferably 0.5 to 3.0 parts by mass, more preferably 0.7 to 3.0 parts by mass, even more preferably 0.7 to 2.8 parts by mass, based on the total mass (100 parts by mass) of the monomer mixture. Furthermore, the content of n-dodecyl mercaptan is preferably 0.1 to 1.0 part by mass, more preferably 0.3 to 1.0 part by mass, even more preferably 0.3 to 0.8 parts by mass, based on the total mass (100 parts by mass) of the monomer mixture.

The resin B may be synthesized or obtained commercially. The resin B is preferably synthesized using the monomer mixture and a reactive emulsifier. The use of the reactive emulsifier allows the production of a resin B emulsion. The ink composition according to the present embodiment is preferably prepared using such a resin B emulsion.

The resin B may be prepared using any amount of the reactive emulsifier. As a guide, the reactive emulsifier is generally used in an amount of 0.1 to 10% by mass, preferably 0.3 to 5% by mass, more preferably 0.5 to 3% by mass, even more preferably 1 to 3% by mass, based on the total mass of the monomer mixture. When the reactive emulsifier is used in an amount in such a range, the resin B will tend to be synthesized in a stable manner, to have an average particle diameter controlled in a desired range, and to form an emulsion having a viscosity that is adjustable within a desired range.

The resin B generally has an average particle diameter of 10 to 500 nm, preferably 20 to 300 nm, more preferably 40 to 200 nm, even more preferably 50 to 150 nm. The resin B with an average particle diameter in such a range will tend to be less likely to cause clogging in inkjet heads and less likely to undergo re-aggregation.

The resin B generally has a glass transition temperature (Tg) of 70 to 280° C., preferably 100 to 270° C., more preferably 150 to 260° C., even more preferably 200 to 250° C. The resin B generally has an acid value of 3 to 80 mgKOH/g, preferably 5 to 70 mgKOH/g, more preferably 10 to 60 mgKOH/g, even more preferably 15 to 50 mgKOH/g.

The resin B generally has an insolubility in tetrahydrofuran of 60 to 100%, preferably 70 to 80%. The resin B with an insolubility in such a range will tend to have a controlled average molecular weight and to be free of impurities such as unreacted monomers.

The content (on a solid basis) of the resin B in the ink composition according to the present embodiment generally has a lower limit of 0.1% by mass, preferably 0.2% by mass, more preferably 0.3% by mass, and generally has an upper limit of 10% by mass, preferably 7% by mass, more preferably 6% by mass, even more preferably 5% by mass, based on the total mass of the ink composition.

The resins A and B may be mixed in any ratio. Changing the mixing ratio allows the ink composition to have high ability to be washed away, to have high ability to form a print with high scratch resistance, to have high color vibrancy, or to have high glossiness, and can be expected to reduce VOC in the ink designing. The ink composition according to the present embodiment preferably has a ratio A/B of 0.1 to 10, more preferably 0.2 to 5, even more preferably 0.2 to 4, furthermore preferably 0.25 to 2.34, still more preferably 0.25 to 1.0, in which A is the content (on a solid basis) of the resin A in the ink composition, and B is the content (on a solid basis) of the resin B in the ink composition.

[Water]

The water is preferably ion-exchanged water, distilled water, or any other type of water with less impurities, (such as metal ions).

The ink composition according to the present embodiment generally has a water content of 30 to 80% by mass, preferably 35 to 75% by mass, more preferably 40 to 70% by mass, based on the total mass of the ink composition.

[Water-Soluble Organic Solvent]

The ink composition according to the present embodiment preferably further includes a water-soluble organic solvent. Examples of the water-soluble organic solvent include C1-C6 alkanols, such as methanol, ethanol, propanol, isopropanol, butanol, isobutanol, sec-butanol, and tert-butanol; carboxylic acid amides, such as N, N-dimethylformamide and N, N-dimethylacetamide; lactams, such as 2-pyrrolidone, N-methyl-2-pyrrolidone, and N-methylpyrrolidin-2-one; cyclic ureas, such as 1,3-dimethylimidazolidin-2-one and 1,3-dimethylhexahydropyrimid-2-one; ketones or keto alcohols, such as acetone, 2-methyl-2-hydroxypentan-4-one, and ethylene carbonate; cyclic ethers, such as tetrahydrofuran and dioxane; monoalkylene, oligoalkylene, or polyalkylene glycols or thioglycols having a C2-C6 alkylene unit, such as ethylene glycol, diethylene glycol, 1,2-propylene glycol, 1,3-propylene glycol, 1,2-butylene glycol, 1,4-butylene glycol, diethylene glycol, triethylene glycol, tetraethylene glycol, dipropylene glycol, polyethylene glycol (preferably with a molecular weight of 400, 800, 1540, or more), polypropylene glycol, thiodiglycol, and dithioglycol; C3-C9 polyols (triols), such as glycerol, diglycerol, hexane-1,2,6-triol, and trimethylolpropane; glycol ethers, such as ethylene glycol monomethyl ether, ethylene glycol monoethyl ether, ethylene glycol monoallyl ether, ethylene glycol monoisopropyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, propylene glycol monopropyl ether, propylene glycol monobutyl ether, and dipropylene glycol monomethyl ether (preferably glycol ether selected from the group consisting of C3-C10 monoethylene, diethylene, or triethylene glycol ethers and C4-C13 monopropylene, dipropylene, or tripropylene glycol ethers); C5-C9 alkanediols, such as 1,2-pentanediol, 1,5-pentanediol, 1,2-hexanediol, 1,6-hexanediol, 2-methyl-2,4-pentanediol, 2-ethyl-1,3-hexanediol, and 2,4-diethyl-1,5-pentanediol; γ-butyrolactone; and dimethyl sulfoxide. In particular, the water-soluble organic solvent is preferably selected from the group consisting of glycol ethers and C5-C9 alkanediols.

The ink composition according to the present embodiment generally has a water-soluble organic solvent content of 0 to 60% by mass, preferably 1 to 60% by mass, more preferably 2 to 50% by mass, even more preferably 3 to 45% by mass, furthermore preferably 5 to 40% by mass, based on the total mass of the ink composition.

[Other Components]

The ink composition according to the present embodiment may further include an ink modifying agent in addition to the components described above. Examples of the ink modifying agent include a surfactant (excluding the reactive emulsifier surfactant), an antiseptic or antifungal agent, a pH adjuster, and a defoaming agent.

The ink composition according to the present embodiment generally has a total ink modifying agent content of 0 to 30% by mass, preferably 0.1 to 20% by mass, more preferably 0.5 to 10% by mass, based on the total mass of the ink composition.

Examples of the surfactant include anionic, cationic, nonionic, amphoteric, silicone, and fluorinated surfactants. In particular, the surfactant is preferably one selected from the group consisting of a silicone surfactant and a fluorinated surfactant, and is more preferably a silicone surfactant in view of biological or environmental safety.

Examples of the anionic surfactant include alkyl sulfocarboxylate, α-olefin sulfonate, polyoxyethylene alkyl ether acetate, polyoxyethylene alkyl ether sulfate, N-acylamino acid or salts thereof, N-acylmethyltaurine salt, alkyl sulfate polyoxyalkyl ether sulfate, alkyl sulfate polyoxyethylene alkyl ether phosphate, rosin acid soap, castor oil sulfate salt, lauryl alcohol sulfate salt, alkylphenol phosphate, alkyl phosphate, alkyl aryl sulfonate, diethyl sulfosuccinate, diethylhexyl sulfosuccinate, and dioctyl sulfosuccinate.

Examples of the cationic surfactant include 2-vinylpyridine derivatives and poly(4-vinylpyridine) derivatives.

Examples of the nonionic surfactant include ether surfactants, such as polyoxyethylene nonylphenyl ether, polyoxyethylene octylphenyl ether, polyoxyethylene dodecylphenyl ether, polyoxyethylene oleyl ether, polyoxyethylene lauryl ether, polyoxyethylene alkyl ether, and polyoxyethylene distyrenated phenyl ether (e.g., EMULGEN A-60, A-90, and A-500 manufactured by Kao Corporation); ester surfactants, such as polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; acetylene glycol (or acetylene alcohol) surfactants, such as 2,4,7,9-tetramethyl-5-decyn-4,7-diol, 3,6-dimethyl-4-octyn-3,6-diol, and 3,5-dimethyl-1-hexyn-3-ol; and polyglycol ether surfactants. Examples of commercially available surfactants include SURFYNOL 104, 104PG50, 82, 420, 440, 465, and 485 and OLFINE STG manufactured by Nisshin Chemical Industrial Co., Ltd; and EMULGEN A-60, A-90, and A-500 manufactured by Kao Corporation.

Examples of the amphoteric surfactant include lauryl dimethylaminoacetic acid betaine, 2-alkyl-N-carboxymethyl-N-hydroxyethylimidazolinium betaine, coconut oil fatty acid amidopropyl dimethylaminoacetic acid betaine, polyoctyl polyaminoethyl glycine, and imidazoline derivatives.

Examples of the silicone surfactant include polyether-modified siloxanes and polyether-modified polydimethylsiloxanes. Specific examples include DYNOL 960 and 980 manufactured by Air Products; SILFACE SAG001, SAG002, SAG003, SAG005, SAG503A, SAG008, SAG009, and SAG010 manufactured by Nissin Chemical Industry Co., Ltd.; BYK-345, BYK-347, BYK-348, BYK-349, BYK-3455, LP-X23288, LP-X23289, and LP-X23347 manufactured by BYK Additives & Instruments; and TEGO Twin 4000 and TEGO Wet KL 245, 250, 260, 265, 270, and 280 manufactured by Evonik Tego Chemie.

Examples of the fluorinated surfactant include perfluoroalkyl sulfonic acid compounds, perfluoroalkyl carboxylic acid compounds, perfluoroalkyl phosphate compounds, perfluoroalkyl ethylene oxide adducts, and polyoxyalkylene ether polymer compounds having a perfluoroalkyl ether group-containing side chain.

Examples of the antiseptic or antifungal agent include organosulfur compounds, organonitrogen sulfur compounds, organohalogen compounds, haloarylsulfone compounds, iodopropagyl compounds, haloalkylthio compounds, nitrile compounds, pyridine compounds, 8-oxyquinoline compounds, benzothiazole compounds, isothiazoline compounds, dithiol compounds, pyridine oxide compounds, nitropropane compounds, organotin compounds, phenolic compounds, quaternary ammonium salts, triazine compounds, thiazine compounds, anilide compounds, adamantane compounds, dithiocarbamate compounds, brominated indanone compounds, benzyl bromoacetate compounds, inorganic salts; sodium dehydroacetate, sodium benzoate, sodium pyridinethione-1-oxide, ethyl p-hydroxybenzoate, 1,2-benzisothiazolin-3-one, and salts thereof. Examples of commercially available antiseptic or antifungal agents include Proxel GXL (S) and Proxel XL-2 (S) manufactured by Lonza.

The pH adjuster may be any substance that can adjust the pH of the ink composition to 5 to 11 without adversely affecting the ink composition being prepared. Examples of the pH adjuster include alkanolamines, such as diethanolamine, triethanolamine, and N-methyldiethanolamine; alkali metal hydroxides, such as lithium hydroxide, sodium hydroxide, and potassium hydroxide; ammonium hydroxide (ammonia water); alkali metal carbonates, such as lithium carbonate, sodium carbonate, sodium hydrogen carbonate, and potassium carbonate; alkali metal salts of organic acids, such as sodium silicate and potassium acetate; and inorganic bases, such as disodium phosphate.

Examples of the defoaming agent include silicone compounds, silica/mineral oil-based defoaming agents, olefin compounds, and acetylene compounds. Examples of commercially available defoaming agents include SURFYNOL DF37, DF58, DF110D, DF220, and MD-20 and OLFINE SK-14 manufactured by Shin-Etsu Chemical Co., Ltd.

In a case where the ink composition contains the defoaming agent, it generally has a deforming agent content of 0.01 to 5% by mass, preferably 0.03 to 3% by mass, more preferably 0.05 to 1% by mass. The defoaming agent will tend to be effective at a content of 0.01% by mass or more and tend to provide good dispersion stability at a content of 5% by mass or less.

[Physical Properties and Other Properties of the Ink Composition]

For use as inkjet recording ink, the ink composition according to the present embodiment should preferably have a low content of inorganic impurities such as metal cation chlorides (e.g., sodium chloride) and sulfates (e.g., sodium sulfate). As a guide, the ink composition should have an inorganic impurity content of about 1% by mass or less based on the total mass of the colorant. The inorganic impurity content may have a lower limit equal to or lower than the analyzer detection limit, which may be 0% by mass.

Inorganic impurities are often mixed in the colorant. If desired, therefore, the inorganic impurities may be removed from the colorant by purification. The purification method includes, for example, suspending the colorant solid in a mixed solvent of water and a C1-C4 alcohol, such as methanol, to purify the colorant; or subjecting the prepared ink to ion exchange resin treatment to exchange and adsorb inorganic impurities.

The ink composition according to the present embodiment generally has a pH at 25° C. of 7 to 11, preferably 8 to 10. The ink composition according to the present embodiment generally has a surface tension at 25° C. of 10 to 50 mN/m, preferably 20 to 40 mN/m. The ink composition according to the present embodiment generally has a viscosity at 25° C. of 2 to 30 mPa·s, preferably 3 to 20 mPa·s. The pH, surface tension, and viscosity of the ink composition according to the present embodiment can be adjusted as appropriate using a selected type and amount of a pH adjuster, a surfactant, and a water-soluble organic solvent, or other materials.

The ink composition according to the present embodiment has high storage stability, high jetting stability, high re-dissolvability, and high re-dispersibility and can achieve a lower VOC content. The ink composition according to the present embodiment can produce prints with well-balanced lightfastness, ozone resistance, moisture resistance, color saturation, color vibrancy, glossiness, rubfastness, bronzing ability, silvering ability, and less bleeding.

The ink composition according to the present embodiment may be used for various types of recording. For example, the ink composition according to the present embodiment is suitable for use in writing materials, various types of printing, information recording, textile printing, and other applications, and is particularly suitable for use in inkjet printing.

<Inkjet Recording Method, Inkjet Printer, and Recording Media>

An inkjet recording method according to the present embodiment includes: ejecting droplets of the ink composition onto a recording medium from an inkjet printer in response to a recording signal to perform recording. For inkjet recording, a container containing the ink composition is loaded in a predetermined position in an inkjet printer so that the recording is ready to be performed as mentioned above.

The inkjet recording method according to the present embodiment may be performed using the ink composition alone or using the ink composition in combination with an additional ink composition(s). To produce full-color recorded images, for example, the ink composition may be used in combination with an additional ink composition(s) with a hue different from that of the ink composition.

An industrial inkjet printer may also be used, which is preferably a line head type inkjet printer for high-speed, single-pass printing. Even under such printing conditions, the ink composition can produce recorded images with good color vibrancy and high rubfastness.

The inkjet method may be any known type. Examples of the inkjet method include charge control methods, drop-on-demand methods (pressure pulse methods), acoustic inkjet methods, and thermal inkjet methods. Other examples include a method including ejecting a large number of droplets of a small volume of the ink composition with a low colorant content to form images with improved quality; a method including depositing droplets of multiple ink compositions having substantially the same hue but different colorant contents to form images with improved quality; and a method using the ink combination in combination with a colorless transparent ink composition to improve the fixation of the colorant.

The term "recording medium" refers to a material to which the ink composition can adhere. Examples of the recording medium include paper, films, fibers, or clothes (e.g., cellulose, nylon, wool), leather, and color filter substrates.

Recording media can be broadly divided into those with an ink absorbing layer and those with no ink absorbing layer.

The recording medium having an ink-receiving layer is usually named, for example, inkjet paper, inkjet film, or glossy paper. Typical examples of commercially available products include Professional Photo Paper, Super Photo Paper, Glossy Gold, and Matte Photo Paper manufactured by Canon Inc.; Crispia Photo Paper (high gloss), Crispia Photo Paper (gloss), and Crispia Matte Photo Paper manufactured by Seiko Epson Corporation; Advanced Photo Paper (gloss) manufactured by Hewlett-Packard Japan, Ltd.; and GASAI Photo Finish Pro manufactured by FUJIFILM Corporation.

Examples of the recording medium having no ink-receiving layer include various types of paper for use in gravure or offset printing, such as coated paper and art paper; and cast coated paper for use in label printing. The ink composition is suitable for use on recording media having no ink-receiving layer.

When used for recording, the recording medium having no ink-receiving layer is preferably subjected to surface modification treatment for improving its ability to fix the colorant thereon. The surface modification treatment may be, for example, corona discharge treatment, plasma treatment, or flame treatment.

It will be understood that for all of the features described above, any combination of preferred features will be more preferred, and any combination of more preferred features will be even more preferred. The same applies to combinations of preferred features and more preferred features, and to combinations of more preferred features and even more preferred features, and so on.

EXAMPLES

Hereinafter, the present invention will be described in more detail with reference to examples, which are not intended to limit the present invention.

In the description of the examples, unless otherwise specified, "parts" and "%" mean "parts by mass" and "% by mass", respectively. Unless otherwise stated, all operations including various types of synthesis and preparation in the examples were performed under stirring. If necessary, the solid content of liquids was measured by the dry weight method using MS-70 manufactured by A&D Company, Limited.

The "water" used in the examples is ion-exchanged water. In addition, the reactive emulsifier used in the examples is an ammonium salt of sulfuric acid ester of a product of polyaddition of oxirane with a product of reaction between C10-C14 branched alkanol and 1-(allyloxy)-2,3-epoxypropane, which is composed mainly of α-[2-(allyloxy)-1-({C10-C14 alkyloxy}methyl)ethyl]-ω-hydroxypoly(oxyethylene) (n=1 to 100).

Preparation Example 1: Preparation of Resin A

A stirrer-equipped glass reaction vessel (3 L volume) was equipped with a reflux condenser, a thermometer, and a dropping funnel and then charged with ion-exchanged water (152 parts), sodium polyoxyethylene alkyl ether sulfate (1.4 parts), and potassium persulfate (0.3 parts). After the air in the vessel was replaced with nitrogen, the temperature in the vessel was adjusted to 80° C. with stirring, and a raw material liquid (emulsion) was continuously added dropwise to the vessel over 3 hours. The raw material liquid was preliminarily prepared by mixing and stirring, in a separate vessel, ion-exchanged water (62 parts), sodium polyoxyethylene alkyl ether sulfate (0.99 parts), the reactive emulsifier (1 part), butyl acrylate (41 parts), methyl methacrylate (47 parts), methacrylic acid (10 parts), sodium styrene sulfonate (0.5 parts), and allyl methacrylate (1.5 parts) to form an emulsion. During the dropwise addition, the reaction was carried out at 80° C. with nitrogen being introduced into the vessel. After the dropwise addition was completed, the mixture was further stirred at 85"° C. for 2 hours and then cooled to 40° C. After the cooling, triethanolamine (1.1 parts) was added to the mixture, so that a resin A (modified acrylic resin) emulsion was obtained. The resulting resin A had an acid value of 65 mgKOH/g and a Tg of 47° C.

Preparation Example 2: Preparation of Resin B

A stirrer-equipped glass reaction vessel (3 L volume) was equipped with a reflux condenser, a thermometer, and a dropping funnel and then charged with ion-exchanged water (289 parts), sodium lauryl sulfate (0.7 parts), and sodium persulfate (0.1 parts). After the air in the vessel was replaced with nitrogen, the temperature in the vessel was adjusted to 80° C. with stirring, and a raw material liquid (emulsion) was continuously added dropwise to the vessel over 3 hours. The raw material liquid was preliminarily prepared by mixing and stirring, in a separate vessel, ion-exchanged water (84 parts), sodium lauryl sulfate (6.6 parts), the reactive emulsifier (1 part), styrene (37.06 parts), methacrylic acid (1.8 parts), acrylic acid (1.15 parts), divinylbenzene (59.04 parts), n-dodecyl mercaptan (0.57 parts), and sodium styrene sulfonate (0.38 parts) to form an emulsion. During the dropwise addition, the reaction was carried out at 80° C. with nitrogen being introduced into the vessel. After the dropwise addition was completed, the mixture was further stirred at 85'° C. for 2 hours and then cooled to 40° C. After the cooling, polyoxyethylene lauryl ether (4 parts) and triethanolamine (1.5 parts) were added to the mixture so that a resin B (styrene resin cross-linked with divinylbenzene) emulsion was obtained. The resulting resin B had an acid value of 21 mgKOH/g and a Tg of 225° C.

Preparation Example 3: Preparation of Colorant Dispersion

A block copolymer (block copolymer A) was obtained by following Synthesis Example 3 in PCT International Publication No. WO2013/115071. The block copolymer A (10.62 parts) and 2-butanone (8.2 parts) were added to a solution of sodium hydroxide (0.36 parts) in ion-exchanged water (64.4 parts) and stirred for 1 hour to form a homogeneous solution. To the resulting solution was added C.I. Pigment Blue 15:4 (Heliogen Blue D7115F manufactured by BASF) (16 parts), and in a sand grinder, the resulting mixture was subjected to dispersion treatment under the conditions of 1500 rpm for 15 hours to give a dispersion. After water (100 parts) was added to the resulting dispersion, the mixture was filtered to give a filtrate. From the resulting filtrate, 2-butanone and some of the water were removed by distillation under reduced pressure, so that a colorant dispersion with a colorant content of 12.48 was obtained. In the dispersion, the colorant had an average particle diameter (D50) of 138 nm, an average particle diameter (D90) of 230 nm, and an average particle diameter (D10) of 81 nm.

Examples 1 to 5: Preparation of Ink Composition

As shown in Table 3 below, each set of components was mixed to form a liquid mixture in a total amount of 100 parts, and the resulting liquid mixture was filtered through a membrane filter with a pore size of 3 μm to give each of ink compositions of Examples 1 to 5 to be subjected to evaluation tests.

Comparative Examples 1 and 2: Preparation of Ink Composition

As shown in Table 3 below, each set of components was mixed to form a liquid mixture in a total amount of 100 parts, and the resulting liquid mixture was filtered through a membrane filter with a pore size of 3 μm to give each of ink compositions of Comparative Examples 1 and 2 to be subjected to evaluation tests.

Preparation Example 4: Preparation of Liquid Cleaner

A liquid cleaner for an evaluation test was obtained as in Examples 1 to 5 except that the components shown in Table 3 were used.

The abbreviations in Table 3 below have the meaning below. In Table 3, the numerical value in each component column indicates the amount (parts) of the corresponding component, and the symbol "-" means the absence of the corresponding component. In Table 3, the numerical value in each of the resin A and B columns indicates the amount (parts) of the resin A or B on a solid basis.

PG: Propylene glycol (manufactured by Junsei Chemical Co., Ltd.)

2Py: 2-Pyrrolidone (manufactured by Junsei Chemical Co., Ltd.)

12HD: 1,2-Hexanediol (manufactured by Kanto Chemical Co., Ltd.)

TEA: Triethanolamine (manufactured by Kanto Chemical Co., Inc.)

TEX: Texanol (manufactured by Eastman Chemical Company)

BYK-349: Silicone surfactant (BYK-349 manufactured by BYK)

GXL (S): Proxel GXL (S) (manufactured by Lonza)

Resin A: Resin A emulsion obtained in Preparation Example 1

Resin B: Resin B emulsion obtained in Preparation Example 2

TABLE 3

| Compo- | Example | | | | | Comparative Example | | Preparation Example |
|---|---|---|---|---|---|---|---|---|
| nents | 1 | 2 | 3 | 4 | 5 | 1 | 2 | 4 |
| Colorant dispersion | 44.4 | 44.4 | 44.4 | 44.4 | 44.4 | 44.4 | 44.4 | — |
| PG | 10.0 | 8.0 | 4.0 | 1.0 | — | — | 14.0 | 30.0 |
| 2Py | 5.0 | 5.0 | 5.0 | 5.0 | 4.0 | — | 5.0 | 15.0 |
| 12HD | 7.0 | 7.0 | 7.0 | 7.0 | 7.0 | 7.0 | 7.0 | 21.0 |
| TEX | 0.5 | 0.5 | 0.5 | 0.5 | 0.5 | 0.5 | 0.5 | 1.5 |
| TEA | 0.7 | 0.7 | 0.7 | 0.7 | 0.7 | 0.7 | 0.7 | 2.1 |
| BYK-349 | 0.9 | 0.9 | 0.9 | 0.9 | 0.9 | 0.9 | 0.9 | 2.7 |
| GKL (S) | 0.1 | 0.1 | 0.1 | 0.1 | 0.1 | 0.1 | 0.1 | 0.1 |
| Resin A | 1.0 | 1.5 | 2.5 | 3.5 | 4.0 | 5.0 | — | — |
| Resin B | 4.0 | 3.5 | 2.5 | 1.5 | 1.0 | — | 5.0 | — |
| Water | Remainder | | | | | | | |
| Total | 100 | | | | | | | |

[Inkjet Recording]

The ink compositions obtained in the examples and the comparative examples were each loaded in a printer equipped with an inkjet head KJ4B-YH (600 dpi×600 dpi) manufactured by Kyocera Corporation and ejected from the head onto coated paper OK Top Coat+ manufactured by Oji Paper Co., Ltd. under the conditions of a droplet size of 12 pl and a speed of 25 m/min for inkjet recording. Using each of the ink compositions of the examples and the comparative example, the inkjet recording was performed to form a 100% duty solid image. The resulting prints were used as test pieces and subjected to the color vibrancy test and the scratch test. The color of each test piece was measured using a colorimeter exact (trade name) manufactured by X-rite, Inc. The color was measured under the conditions: density standard, ISO status T; view angle 2°; light source D50.

[Color Vibrancy Test]

Each test piece obtained as described above was measured for Dc value (OD value). The results are shown in Table 4 below. The resulting larger Do value means the higher color vibrancy.

[Scratch Test]

Each test piece was evaluated for scratch resistance using a pencil and spring load type scratch hardness tester (according to JIS K5600 May 4, manufactured by Cotec Corporation). Specifically, in the test using the tester with two wheels, the inkjet recorded portion of the test piece was pressed at an angle of 45° under a load of 750 g and evaluated according to the three-scale criteria below. The results are shown in Table 4 below.

—Evaluation Criteria—

A: Almost no scratches observed on the recorded image.

B: A few scratches observed on the recorded image.

C: Very large scratches observed on the recorded image.

[Test for Ability to be Washed Away]

Twenty μL of each of the ink compositions of the examples and the comparative examples was dropped onto a glass Petri dish (Flat Petri Dish 70, manufactured by Tokyo Garasu Kikai Co., Ltd.) and allowed to stand to dryness in a thermostatic chamber at 60° C. for 1 hour, so that the ink composition was solidified into a solid sample. Ten mb of the liquid cleaner obtained in Preparation Example 4 was dropped onto the resulting solid sample, and it was visually evaluated whether the solid sample was dissolvable and removable. The evaluation was performed according to the four-scale criteria below. The results are shown in Table 4 below.

—Evaluation Criteria—

A: No solid residue was observed, and a homogeneous solution formed.

B: A small amount of a solid residue was observed, but an almost homogeneous solution formed.

C: A solid residue was clearly observed, and no homogeneous solution was observed.

[Glossiness (20°, 60°)]

The glossiness (20°, 60°) of each test piece was measured using a hand-held gloss meter (manufactured by Nihon Denshoku Industries Co., Ltd.). The results are shown in Table 4 below. In general, the glossiness increases with increasing color vibrancy.

[VOC Content]

The VOC content of each of the ink compositions of the examples and the comparative examples was evaluated. The evaluation was performed according to the four-scale criteria below. The results are shown in Table 4 below.

—Evaluation Criteria—

A: The ink composition has a VOC content of 23% by mass or less.

B: The ink composition has a VOC content of more than 23% by mass and 25% by mass or less.

C: The ink composition has a VOC content of more than. 25% by mass.

TABLE 4

| Evaluation | | Example | | | | | Comparative Example | |
|---|---|---|---|---|---|---|---|---|
| results | | 1 | 2 | 3 | 4 | 5 | 1 | 2 |
| De value (color vibrancy) | | 2.10 | 2.08 | 2.09 | 2.06 | 2.06 | 2.02 | 2.01 |
| Scratch resistance | | A | A | A | A | A | C | A |
| Ability to be washed away | | A | A | A | A | A | A | C |
| Glossiness | 20° | 10 | 10 | 10 | 10 | 10 | 9 | 8 |
| | 60° | 49 | 50 | 50 | 49 | 48 | 46 | 45 |
| VOC reduction | | A | A | A | A | A | A | C |
| VOC content (%) | | 23 | 21 | 17 | 14 | 12 | 8 | 27 |

The results in Table 4 show that the ink composition of each of the examples had high color vibrancy and high scratch resistance. Even when the ink composition of each of the examples was dried into a solid, it was demonstrated that the solid was able to be washed away sufficiently. On the other hand, the ink composition of each of the comparative examples had low color vibrancy and did not balance scratch resistance and the ability to be washed away.

What is claimed is:

1. An ink composition comprising: a water-insoluble colorant; a dispersing agent; a resin A; a resin B; and water, wherein the resin A is a resin comprising a product of polymerization of at least C1-C4 alkyl methacrylate or C2-C6 alkyl acrylate, and the resin B is a resin comprising a product of polymerization of at least a styrenic monomer or divinylbenzene, wherein a ratio of the resin A to the resin B (A/B) is 0.1 to 10, and wherein A is a content on a solid basis of the resin A in the ink composition, and B is a content on a solid basis of the resin B in the ink composition.

2. The ink composition according to claim 1, wherein the resins A and B each comprise a product of polymerization of a reactive emulsifier having a radically polymerizable double bond.

3. The ink composition according to claim 2, wherein the reactive emulsifier has an anionic group.

4. The ink composition according to claim 3, wherein the anionic group is a salt of a sulfate ester group.

5. The ink composition according to claim 1, further comprising a water-soluble organic solvent.

6. An inkjet recording method comprising: ejecting droplets of the ink composition according to claim 1 onto a recording medium from an inkjet printer in response to a recording signal to perform recording.

7. The inkjet recording method according to claim 6, wherein the recording medium is a recording medium having an ink-receiving layer.

8. The inkjet recording method according to claim 6, wherein the recording medium is a recording medium having no ink-receiving layer.

9. The inkjet recording method according to claim 6, wherein the inkjet printer is a line head type inkjet printer.

10. A recorded medium comprising: a recording medium; and the ink composition according to claim 1 deposited on the recording medium.

11. The recorded medium according to claim 10, wherein the recording medium is one selected from the group consisting of a recording medium having an ink-receiving layer and a recording medium having no ink-receiving layer.

12. An inkjet printer comprising a container containing the ink composition according to claim 1.

13. The inkjet printer according to claim 12, wherein the inkjet printer is a line head type inkjet printer.

* * * * *